March 22, 1960  D. G. JONES  2,930,037
AMBIGUITY RESOLUTION IN RADIO LOCATION SYSTEMS
Filed March 20, 1957  4 Sheets-Sheet 4
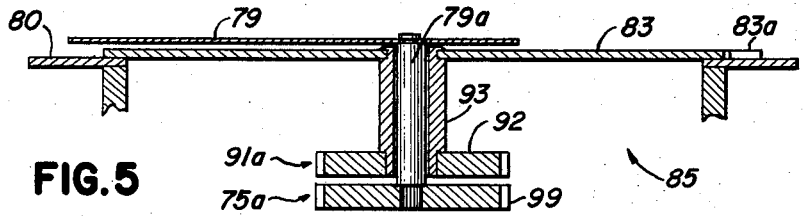
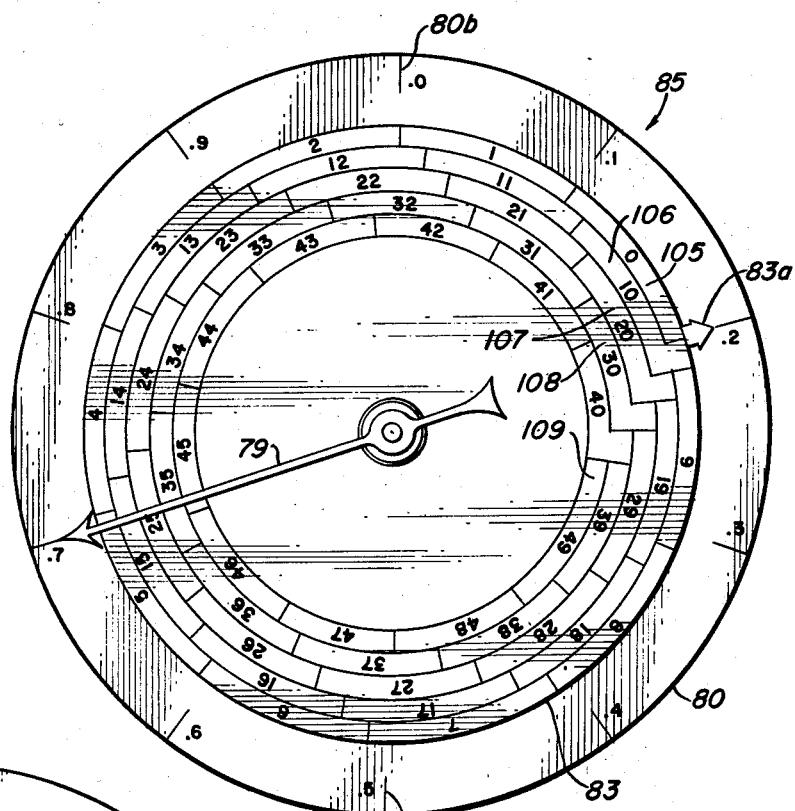
INVENTOR
DALE G JONES
BY
Mason, Kolehmainen, Rathburn and Wyss
ATTORNEYS United States Patent Office 2,930,037
Patented Mar. 22, 1960

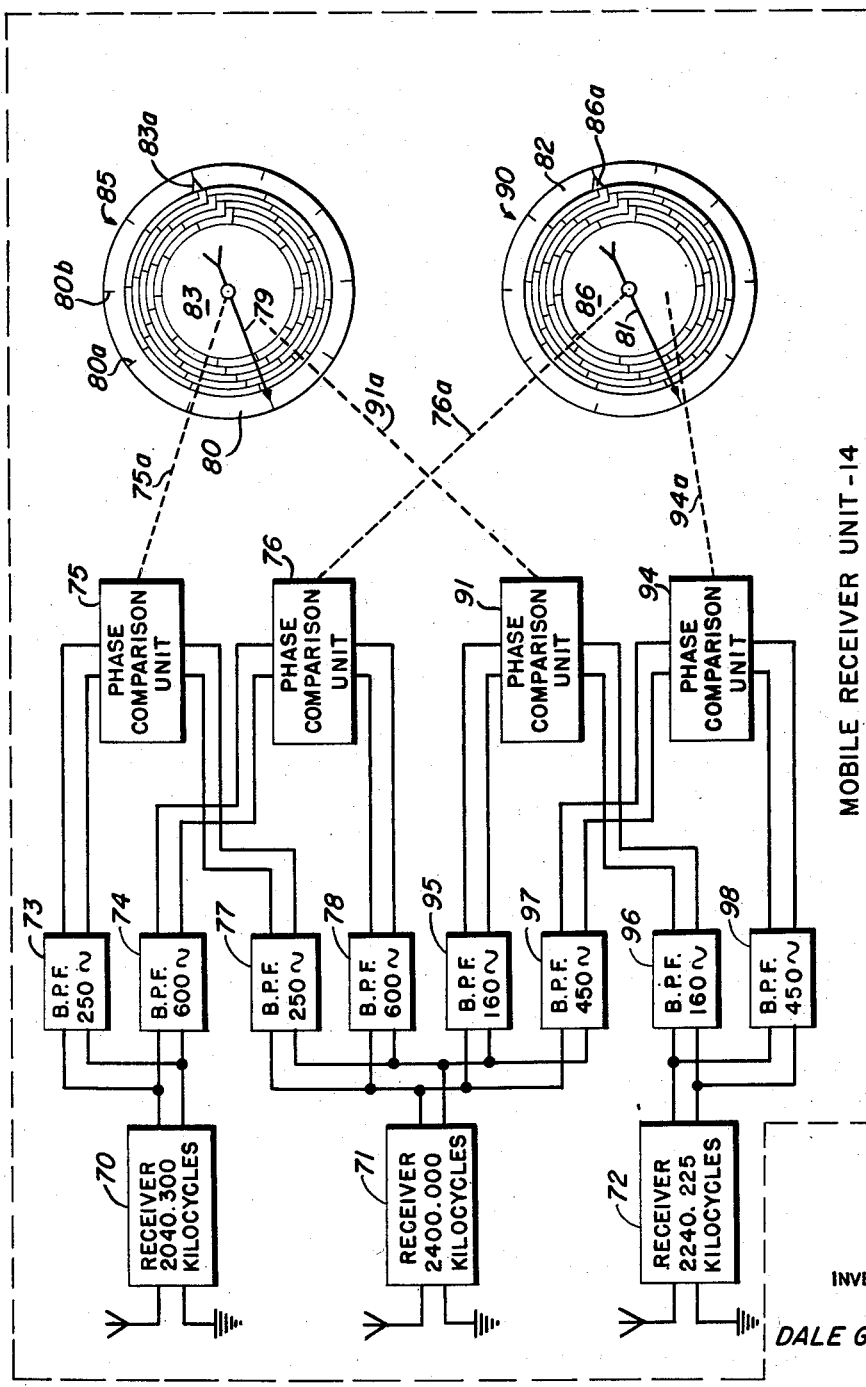

2,930,037

AMBIGUITY RESOLUTION IN RADIO LOCATION SYSTEMS

Dale G. Jones, Centerville, Iowa, assignor to Seismograph Service Corporation, Tulsa, Okla., a corporation of Delaware Application March 20, 1957, Serial No. 647,231

19 Claims. (Cl. 343—105)

The present invention relates to radio position finding systems and more particularly to improvements in radio position finding systems employing phase comparison in pairs of position indication signals radiated from a plurality of spaced transmitting points to provide indications from which the position of a mobile receiving point relative to the known positions of the transmitting points may be determined.

In systems of the particular type referred to, the continuous waves radiated from each pair of transmitters produce standing waves in space, the phase relationship of which changes as a function of changing position between the two transmitting points. More specifically, the waves radiated by the pair of transmitting units of the system are characterized by isophase lines which are hyperbolic in contour about the transmitting points as foci. On a line bisecting the pair of transmitters, these isophase lines are spaced apart a distance equal to one-half the mean wave length of the radiated waves and have diverging spacings at points on either side of this line. With this system arrangement, the position of a receiving point relative to a pair of hyperbolic isophase lines may be determined by measuring the phase relationship between continuous waves radiated from the pair of transmitters.

Since the point of location of the receiving point along the zone separating the two isophase lines is not indicated by such a phase measurement, it becomes necessary to employ at least three spaced transmitters, different pairs of which function to provide a grid-like pattern of intersecting hyperbolic lines, in order to obtain absolute determination of the position of the receiving point. Systems of the character described are exceedingly accurate insofar as the position indications produced at the receiving point are concerned. To obtain the desired indication accuracy, however, it is necessary to maintain phase synchronization between the continuous waves radiated by the spaced transmitters, or, alternatively, so to arrange the system that phase shifts between the radiated waves are compensated during the phase comparing operation.

Phase synchronization of the waves radiated from the plurality of transmitters presents an exceedingly difficult problem which has been the subject of considerable development work. All solutions which have been found for the problem involve the use of relatively elaborate and somewhat delicate instrumentation not well adapted for the continuity of service required in position determining systems. To obviate this problem, systems of the continuous wave hyperbolic type have been proposed utilizing the so-called "heterodyne principle" disclosed and broadly claimed in Honore Patent No. 2,148,267, in which the phase shift problem is obviated by heterodyning the carrier waves of each pair of transmitters at a fixed link transmitting point, and modulating the difference frequency component of the heterodyned waves as a reference signal upon the carrier output of the link transmitter for radiation to the receiving point, where the difference frequency component is detected and phase compared with a difference frequency signal derived by directly heterodyning the transmitted continuous waves at the receiving point. In this manner, phase shifts between the continuous waves radiated from the two transmitters are completely compensated so that the measured phase angle is truly representative of the location of the receiving point between a pair of equiphase lines.

While the described arrangement for obviating the phase synchronization problem is entirely satisfactory, it entails the use of two carrier channels in addition to the three or four channels taken up by the three or four continuously operating survey transmitters, in order to make up a complete system.

An improved arrangement for eliminating the link transmitters without eliminating the functions thereof is disclosed and broadly claimed in Hawkins and Finn Patent No. 2,513,317 wherein a pair of transmitters are alternately operated as link transmitters and as position signal transmitters.

Another problem encountered in the operation of continuous wave systems is that of eliminating ambiguity from the phase measurements which provide the desired position information. Thus, while the two phase measurements identify the position of the receiving station within two lanes defined by two intersecting pairs of hyperbolic isophase lines, they do not indicate the pair of lanes in which the indications are obtained. This means that in operating the system the geographic location of the receiving system must be known at the start of movement of the receiving system relative to the transmitting stations and furthermore, that the successive lanes traversed must be counted as the receiving station is moved relative to the grid-like pattern of hyperbolic lines defining the various lanes. It also means that a mobile craft entering the radiation pattern of the transmitters cannot utilize the radiated signals to determine its position without employing auxiliary equipment to determine the approximate position of the craft relative to the signal transmitters.

In United States Patent No. 2,652,559 of James E. Hawkins, assigned to the same assignee as the present invention, there is disclosed an improved radio location system of the continuous wave type which is free not only of phase synchronization difficulties but also of ambiguity problems. In the system of the said copending application, position indications are obtained having different sensitivities, termed phase sensitivities, insofar as the spacing of the isophase lines is concerned. More pecifically, a plurality of low phase sensitivity position indications and a plurality of high phase sensitivity position indications are obtained, the low phase sensitivity indications being effective to locate the range of the high phase sensitivity indications and being characterized by widely spaced phase coincidences and the high phase sensitivity indications being characterized by closely spaced phase coincidences. The high and low phase sensitivity indications are obtained by producing pairs of beat frequency signals in accordance with the principles of the Honore system and then heterodyning these beat frequency signals to produce position indicating and reference signals for phase comparison which have phase sensitivities determined by phantom frequencies corresponding to the sum of or difference between the mean frequencies of the carrier waves from which the pairs of beat frequency signals were derived.

While this latter system completely solves the ambiguity problem, the phase indications obtained are at times difficult to read and correlate in view of the fact that the two fine position indications appear on different phase meters as do the two coarse position indications. Thus, to keep track of the changes in position of the mobile receiver unit, the operator must take cognizance of four different meter readings.

In accordance with the present invention, the latter difficulty is resolved by providing a new and improved radio location system in which the coarse and fine position indications relating to each set of hyperbolic isophase lines appear upon a single indicating instrument with the result that an operator is required to observe only two such instruments in order to obtain a position determination.

It is therefore an object of the present invention to provide an improved radio location system in which ambiguity resolution is effected while at the same time minimizing the number of measuring instruments required to be observed.

It is a further object of the present invention to provide a radio position finding system of the character described in which non-ambiguous position indications are obtained by providing coarse and fine position indications which both appear upon a single measuring instrument.

It is still a further object of the invention to provide a radio position finding system in which a plurality of low phase sensitivity position indications and high phase sensitivity position indications are obtained on a minimum number of indicating instruments, the low phase sensitivity indications being effective to locate the range of the high phase sensitivity indications and being characterized by widely spaced phase coincidences, and the high phase sensitivity indications being characterized by closely spaced phase coincidences.

Still another object of the invention is to provide a radio position indicating system of the character described wherein such high phase sensitivity and low phase sensitivity position indications are obtained while employing a minimum number of carrier frequencies suitable for efficient long range propagation and in which each of the low phase sensitivity indications appears on the same measuring instrument as one of the high phase sensitivity indications.

It is also an object of the invention to provide improved receiving equipment for use in radio location systems of the above indicated character.

The invention, both as to its organization and method of operation, together with further objects and advantages thereof, will best be understood by reference to the specification taken in connection with the accompanying drawings in which:

Fig. 1 is a pictorial representation of a water-covered area over which survey operations are to be performed, illustrating one positional arrangement of the transmitters embodied in the system and the grid-like system of isophase lines effectively produced in space by the signals radiated by the transmitters;

Fig. 2 diagrammatically illustrates a transmitting system which may be employed in the practice of the present invention;

Fig. 3 diagrammatically illustrates the componet parts of a receiving unit embodying the present invention for providing both high phase sensitivity and low phase sensitivity indications on a single indicating instrument;

Fig. 4 is an enlarged plan view of one of the indicating panels of the present invention;

Fig. 5 is a sectional view taken through the indicating panel shown in Fig. 4; and Fig. 6 is an enlarged fragmentary view illustrating a portion of the indicating panel shown in Fig. 4.

Figure 1:
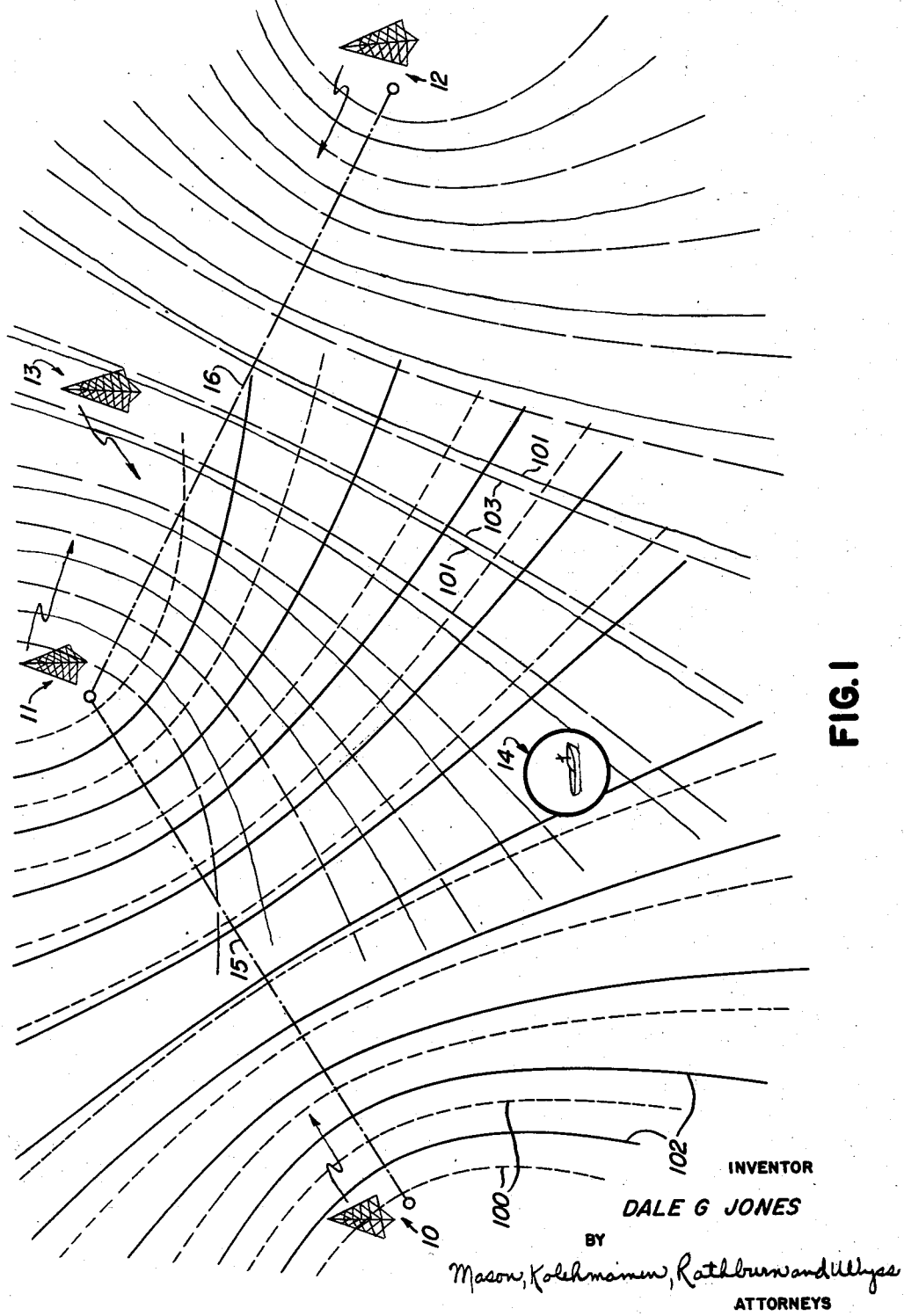
Figure 2:
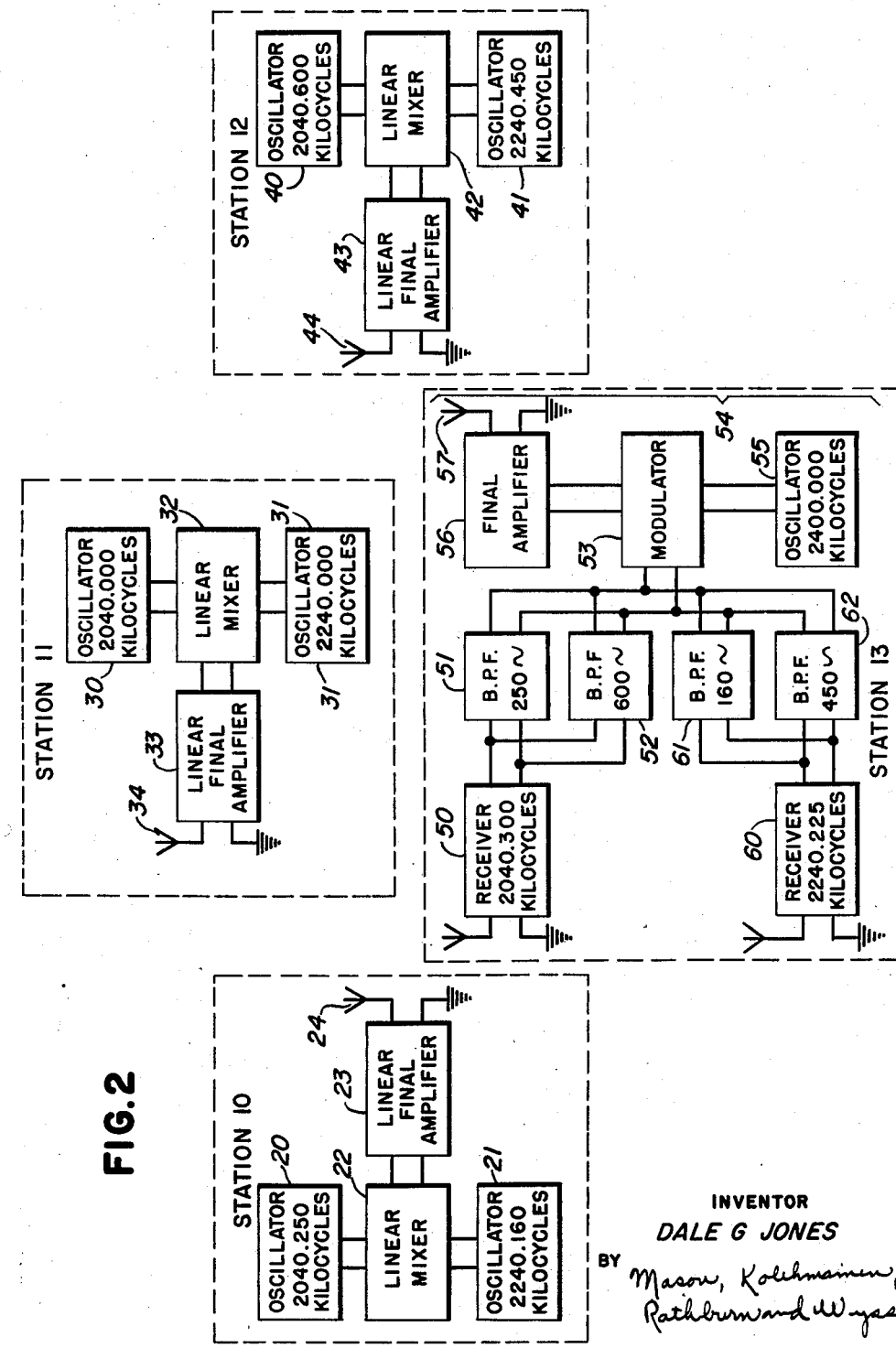

Referring now to the drawings, and more particularly to Figs. 1 and 2 thereof, the present invention is there illustrated as embodied in a three-foci, hyperbolic, continuous wave system for providing position information at any number of mobile receiver units 14 (Fig. 3) which may be carried by vessels or vehicles operating within the radius of transmission of four spaced transmitting units or stations 10, 11, 12 and 13. These units are preferably spaced apart approximately equal distances and are so positioned that and imaginary baseline 15 connecting the points of location of the units 10 and 11 is angularly related to a similar baseline 16 connecting the points of location of the units 11 and 12. The station 13 is located some distance from each of the other three units, as illustrated in Fig. 1.

While the transmitting facilities may take any number of forms well known in the prior art, in the equipment illustrated in Fig. 2, each of the transmitting units 10, 11 and 12 is equipped continuously to radiate a pair of position indicating signals in the form of unmodulated waves, all having different frequencies, with the frequencies being so selected that one of the signals of each pair falls within a single frequency channel, while the other signal of each pair falls within a second frequency channel which is sufficiently removed from the first channel to permit the selective reception of the two frequency channels. The transmitting unit 13 is equipped continuously to radiate reference signals in the form of modulation components which are developed from heterodyning the position indicating signals in pairs and which are modulated upon a carrier wave which differs from the frequencies of the first and second channels described above by a sufficient amount to permit the selective reception of this modulated wave.

Specifically, as shown in Fig. 2, the unit 10 comprises a pair of carrier wave generators or oscillators 20 and 21 respectively developing signals having frequencies of 2040.250 and 2240.160 kilocycles, a linear mixer 22 which mixes the two signals from the oscillators 20 and 21 without developing cross modulation or beat signals therebetween, and a linear final amplifier 23 through which the output signals from the mixer 22 are passed to a radiating or emitting antenna 24. The linear mixer 22 and the linear final amplifier 23 are described in detail in copending application Serial No. 425,271 of William R. Hunsicker, assigned to the same assignee as the present invention. The equipment provided at the transmitting station 11 comprises a pair of oscillators or signal generators 30 and 31 for respectively developing signals having frequencies of 2040.000 and 2240.000 kilocycles, a linear mixer 32 and a final amplifier 33 for supplying the output signals from the mixer 32 to a radiating or emitting antenna 34. Similarly, the equipment provided at the transmitting station 12 comprises a pair of oscillators or signal generators 40 and 41 respectively developing signals having frequencies of 2040.600 and 2240.450 kilocycles, a linear mixer 42 and a linear final amplifier 43 through which signals are passed from the mixer to a radiating or emitting antenna 44.

In view of the foregoing description, it will be recognized that each of the stations 10, 11 and 12 is equipped continuously to radiate a pair of unmodulated or pure waves which are received by suitable equipment provided at the transmitting station 13 and also by the equipment at the mobile receiver unit 14 illustrated in Fig. 3. More specifically, the transmitting station 13 includes a wave signal receiver 50 center tuned to a frequency of 2040.300 kilocycles and adapted to receive the 2040.000 kilocycle signal radiated from the station 11, the 2040.250 kilocycle signal radiated from the station 10 and the 2040.600 kilocycle signal radiated from the station 12, while at the same time rejecting the remaining signal radiated from each of the stations 10, 11 and 12. The receiver 50 functions to heterodyne in pairs the three carrier waves to which it is responsive and develops at its output terminals the three beat frequencies between these pairs of waves. Thus, a 250 cycle beat frequency signal between the two waves accepted from the stations 10 and 11, a 600 cycle signal resulting from heterodyning of the two waves accepted from the stations 11 and 12 and a 350 cycle signal resulting from the heterodyning of the two waves accepted from the stations 10 and 12 are all developed at the output of the receiver 50 and are passed to the input terminals of a pair of band pass filters 51 and 52. The 350 cycle signal is, of course, rejected by both of the filters 51 and 52, while the 250 cycle signal is passed through the filter 51 to an amplitude modulator unit 53 and the 600 cycle signal is passed through the filter 52 to this modulator unit. The modulator unit 53 is included in the equipment comprising a transmitter 54, the remaining components of this transmitter consisting of an oscillator or carrier wave generator 55 developing signals having a frequency of 2400.000 kilocycles and a final amplifier 56 through which signals from the modulator 53 are passed to an antenna 57.

The transmitting station 13 further comprises a receiver 60 center tuned to a frequency of 2240.225 kilocycles and adapted to receive or accept the 2240.160 kilocycle signal radiated from the station 10, the 2240.000 kilocycle signal radiated from the station 11 and the 2240.450 kilocycle signal radiated from the station 12, while rejecting the remaining signals radiated from each of the stations 10, 11 and 12. The receiver 60 functions to heterodyne in pairs the three carrier waves accepted and reproduces at its output terminals a 160 cycle signal resulting from heterodyning the signals received from the stations 10 and 11, a 450 cycle signal resulting from heterodyning the signals received from the stations 11 and 12 and a 290 cycle signal resulting from heterodyning the signals received from the stations 10 and 12. The signals developed by the receiver 60 are passed through a pair of band pass filters 61 and 62, each of which rejects the 290 cycle beat frequency signal. The 160 cycle signal is passed through the filter 61 to the amplitude modulator circuit 53, while the 450 cycle signal is passed through the filter 62 to the modulator 53. The modulator 53, of course, functions to amplitude modulate the four reference signals applied thereto from the filters 51, 52, 61 and 62 upon the carrier wave signal developed by the oscillator 55. As a result, the transmitting station 13 is effective continuously to radiate a 2400.000 kilocycle carrier wave which is continuously modulated with four reference signals having the described frequencies.

The signals radiated from the transmitting stations 10, 11, 12 and 13 are received at the mobile receiver unit 14 which, in accordance with the present invention, is constructed as illustrated in Fig. 3, where the received signals are translated into position indications in the manner described below. The mobile receiver unit 14 comprises three receivers 70, 71 and 72 which are respectively center tuned to frequencies of 2040.300 kilocycles, 2400.000 kilocycles and 2240.225 kilocycles. Thus, the receiver 70 is adapted to receive the 2040.250 kilocycle signal radiated from the station 10, the 2040.000 kilocycle signal radiated from the station 11 and the 2040.600 kilocycle signal radiated from the station 12, but this receiver is sufficiently selective to reject the other signals radiated from each of the stations 10, 11 and 12 and also to reject the modulated carrier wave radiated from the station 13. Receiver 70, like the receiver 50 previously described, heterodynes the three accepted waves in pairs and develops 250 cycle, 350 cycle and 600 cycle beat frequency signals. These three beat frequency signals are applied to band pass filters 73 and 74 each of which rejects the 350 cycle signal. The 250 cycle signal, however, is passed through the filter 73 to a first set of signal input terminals of a phase comparison unit 75. The 600 cycle signal developed by the receiver 70 is passed through filter 74 to a first set of signal input terminals of a phase comparison unit 76.

The receiver 71 rejects all of the waves radiated from the units 10, 11 and 12, but accepts the modulated carrier wave radiated from the station 13 and reproduces all four of the reference signals appearing as modulation components upon this wave. The 250 cycle reference signal is passed through a band pass filter 77 to a second set of signal input terminals of the phase comparison unit 75. The 600 cycle reference signal is passed through a band pass filter 78 to a second set of signal input terminals of the phase comparison unit 76. Each of these phase comparison units is of the general type described in United States Patent No. 2,551,211 to James E. Hawkins and Beverly W. Koeppel, assigned to the same assignee as the present invention, and each consists of a resolver, a phase discriminator, a drive motor and an output shaft indicated by the broken lines. Thus, as will be understood by those skilled in this art, and particularly by reference to the above-identified Hawkins and Koeppel patent, the phase comparison unit 75 responds to the 250 cycle heterodyne and reference signals supplied to its opposed sets of signal input terminals by turning its output shaft 75a by an amount which is dependent upon the phase relationship between the two input signals.

In accordance with the present invention, the output shaft 75a, as indicated in Figs. 3, 4 and 5, provides drive for an indicating instrument indicated generally as 85. To this end, the shaft 75a may be employed to drive an input gear 99 mounted upon a shaft 79a carrying an indicating pointer 79 which cooperates with a graduated, annular, fixed scale 80 to indicate the position of the mobile receiver 14 relative to closely spaced hyperbolic isophase lines having foci at the stations 10 and 11. A few representative isophase lines to which the indications provided by the elements 79 and 80 pertain are identified by the reference numeral 100 in Fig. 1, but it should be observed that the spacing between these isophase lines has been greatly exaggerated for the purpose of illustration. As will be understood by those skilled in this art, the hyperbolic isophase lines 100 are actually spaced apart along the baseline 15 by a distance of approximately 241 feet and these lines, of course, diverge on either side of the baseline 15 so that the spacing gradually increases. Thus, it will be observed that each complete revolution of the indicator or pointer 79 around the annular scale 80 represents the distance traversed by the vessel carrying the mobile receiver unit 14 as it passes from one of the hyperbolic isophase lines 100 to the next adjacent hyperbolic isophase line, the space between these lines being termed a fine or high phase sensitivity lane.

Similarly, the output element or shaft 76a of the phase comparison unit 76 is connected to actuate in indicating instrument 90 by driving a rotatable indicator or pointer 81 which cooperates with a fixed scale 82 to indicate the position of the mobile receiver unit 14 relative to closely spaced hyperbolic isophase lines having foci at the units 11 and 12. The hyperbolic isophase lines to which the readings provided by the elements 81 and 82 pertain are indicated by reference numeral 101 in Fig. 1 and are spaced apart along the baseline 16 by a distance approximately equal to the spacing between the isophase lines 100. Thus, the elements 81 and 82 of the indicating instrument 90 cooperate to provide a fine or high phase sensitivity position indication which represents the position of the mobile receiver unit relative to the isophase lines 101. The intersection of the high phase sensitivity hyperbolic isophase line identified by elements 79 and 80 of the instrument 85 and the hyperbolic isophase line identified by elements 81 and 82 of the instrument 90, of course, locates the mobile receiver unit 14. As previously indicated, each of the described indications is ambiguous in the sense that it does not identify the particular pairs of hyperbolic isophase lines between which the mobile receiver unit is located. In accordance with the present invention, this ambiguity is resolved by means of rotatable indicating dials identified by reference number 83 in the indicating instrument 85 and by the reference numeral 86 in the indicating instrument 90.

Turning now to the mechanism for driving the rotatable dial 83, it will be observed that such mechanism includes a phase comparison unit 91 having an output element 91a connected to drive a gear member 92 illustrated in Fig. 5. The latter gear member is attached to a sleeve 93 encircling the rotatable shaft 79a carrying the indicator or pointer 79. The dial 83 is fixedly secured to the sleeve 93 at a position underlying the indicator 79 and this dial includes a pointer 83a which cooperates with the graduated scale 80 to provide coarse or low phase sensitivity positions in a manner described more fully below.

In a similar manner, the dial 86 is driven by the output element 94a of a phase comparison unit 94 and this dial includes a pointer 86a which cooperates with the graduated scale 82 to provide coarse or low phase sensitivity position indications representative of the location of the mobile receiver unit relative to the stations 11 and 12.

The phase comparison unit 91 functions to compare the 160 cycle reference signal reproduced by the receiver 71 and passed through band pass filter 95 with a 160 cycle beat frequency signal developed by the receiver 72 as a result of heterodyning the waves received from stations 10 and 11, which beat frequency signal is passed through band pass filter 96. As a result, the phase comparison unit 91 drives its output element 91a by an amount corresponding to the phase relationship between the two input signals and, accordingly, the pointer 83a cooperates with the fixed scale 80 to indicate the position of the mobile receiver unit 14 relative to hyperbolic isophase lines having foci at the stations 10 and 11. The latter isophase lines are identified by reference numeral 102 in Fig. 1.

The phase comparison unit 94 is excited by the 450 cycle reference signal reproduced by the receiver 71 and passed through band pass filter 97 and by the 450 cycle beat frequency signal developed by the receiver 72 as a result of heterodyning the waves received from stations 11 and 12. The latter beat frequency signal is, of course, passed through filter 98 before being applied to the phase comparison unit 94. As indicated above, the phase comparison unit 94 drives its output element 94a by an amount corresponding to the phase relationship between the two 450 cycle input signals, with the result that the indicating pointer 86a cooperates with the fixed scale 82 to identify the position of the mobile receiver unit 14 relative to hyperbolic isophase lines having foci at the stations 11 and 12. These isophase lines are represented by the reference numeral 103 in Fig. 1.

In view of the foregoing description, it will be observed that the hyperbolic isophase lines 102 have common foci with the hyperbolic lines 100, i.e. the transmitting stations 10 and 11, but the lines 102 are spaced apart along the base line 15 by a distance of approximately 220 feet while, as previously described, the isophase lines 100 are separated by about 241 feet along the same base line. Moreover, the frequency of each of the oscillators or wave generators at the station 10 are higher than that of the corresponding oscillator at the station 11. Thus, as the mobile receiver unit 14 is moved in a direction to traverse the lines 100 and 102, the pointers 79 and 83a are both rotated in the same direction, but the pointer 83a rotates somewhat faster than the pointer 79. Specifically, the ratio between the rotations of dial 83 and pointer 79 is determined by the frequencies or wave lengths of the radiated waves and, at the indicated frequencies, this ratio is 11.2:10.2. This means that movement of the mobile receiver unit 14 across 10.2 of the fine lanes defined by the isophase lines 100, as indicated by 10.2 revolutions of pointer 79, is accompanied by 11.2 revolutions of the dial 83 since, during the same time, the mobile receiver unit traverses 11.2 of the fine lanes defined by the isophase lines 102. Thus, as the pointer 79 makes one complete revolution, the dial 83 is rotated approximately 1.1 revolutions.

To simplify the explanation of the manner in which the described rotations of pointers 79 and 83a are translated into coarse position indications, let it be assumed that the transmitting stations 10 and 11 are separated by a distance corresponding to 25.5 wave lengths of the mean frequency of the signals developed by oscillators 20 and 30. Such a separation, of course, means that 51 fine lanes are defined by the hyperbolic lines 100 in the region between the stations 10 and 11. Let it also be assumed, for purposes of explanation, that the pointers 79 and 83a both start at the zero indication 80b on the graduated scale 80. As the mobile receiving unit 14 is moved across hyperbolic lines 100 and 102 by sufficient distance to rotate the pointer 79 through one complete revolution, the latter pointer returns to zero but, as indicated above, the pointer 83a at the same time moves through about 1.1 revolutions and, hence, advances to a point near the .1 mark on the scale 80. As another fine lane defined by hyperbolas 100 is crossed, pointer 79 again returns to zero but pointer 83a moves to a position just behind the .2 mark on scale 80 and so on. As more fine lanes are crossed, the pointer 83a continues to advance until it again coincides with pointer 79, a condition which will occur at the .2 mark on scale 80 and not at the zero mark 80b due to the fact that such coincidence occurs after the pointer 79 has been rotated 10.2 revolutions and pointer 83a has been rotated 11.2 revolutions. The distance traveled to bring these pointers back to coincidence defines a coarse lane and, in the present illustration, a coarse lane is equal to 10.2 of the fine lanes defined by hyperbolas 100. In view of the foregoing description, it is apparent that pointers 79 and 83a again coincide after 20.4 revolutions of pointer 79 and, in this case, the coincidence occurs at the .4 mark on scale 80. Other coincidences occur at .6, .8 and again at the zero mark 80b. When the last coincidence occurs, the mobile receiver unit 14 has crossed five coarse lanes or 51 of the fine lanes defined by hyperbolas 100 and this is the maximum possible change since, as previously mentioned, transmitting units 10 and 11 are so spaced that only 51 such fine lanes are defined by the hyperbolic lines 100. Thus, it will be observed that at no location in the area would duplicate readings of pointers 79 and 83a occur, this is, for any given reading of pointer 79 on scale 83 there are no two like readings of pointer 83a on the scale 80 except, of course, the initial and final zero readings. Therefore, while the pointer 79 rotates through 51 complete revolutions, the dial 83 rotates through 56 complete revolutions and at no time between the beginning and end are duplicate combined readings obtained.

It is important to note that if an integral wave length or frequency ratio had been selected, such, for example, as frequencies of 2200 and 2000 kilocycles having a ratio of 11:10, the pointers 79 and 83a would have coincided every ten revolutions of pointer 79. Under these conditions readings in all of the coarse lanes would be alike and ambiguity would exist. For this reason, the ratio between the mean frequency of the signals generated by oscillators 20 and 30 and the mean frequency of the signals generated by oscillators 21 and 31 should be a non-integer.

The transmitting units 10 and 11 may, of course, be spaced apart considerably farther than described above, but this introduces some ambiguity into the coarse readings. However, for a distance equal to 51 of the fine lanes defined by hyperbolas 100, the combined readings of points 79 and 83a are non-repetitive. Thus, by determining the approximate position of the mobile unit as, for example, by employing conventional fine lane or revolution counters, any coarse position ambiguity introduced by increasing the spacing between transmitting stations may be resolved.

When the number of fine lanes per coarse lane is relatively small as in the example given above, the divisions of the dial 83 can be made relatively large so that coarse readings can be taken directly from the indicating device 85. To this end, the dial 83 is provided with five concentric graduated circles indicated 105 to 109 respectively and each representing one of the five coarse lanes previously described. To obtain an accurate position indication, it is necessary to identify both the fine and coarse lane in which the mobile receiver is positioned. If the pointers 79 and 83a occupy the positions shown in Fig. 4, the fine lane reading of pointer 79 or dial 80 is .7 and the fine lane count, as determined from pointer 79 in cooperation with the scales or dial 83 is either 5, 15, 25, 35 or 45 since the pointer 79 passes through these portions of graduated circles 105 to 109. Pointer 79 cooperates with graduated scale 105 to indicate about 5.1, with scale 106 to indicate 15.3, with scale 107 to indicate 25.4, with scale 108 to indicate 35.7 and with scale 109 to indicate 45.8. The fine lane reading provided by pointer 79 and scale 80 informs the operator that the correct reading must end in .7. Thus, the mobile receiver unit is in lane No. 36 or, more accurately, the correct reading should be 35.7 with the decimal portion of the reading representing the fine lane count and the integer portion representing the coarse lane count.

Another example is shown in Fig. 6 wherein the pointer 79 indicates that the fine lane reading is .12. The pointer 79 cooperates with scales 105 to 109 to indicate 0.8, 10.95, 21.15, 31.4 and 41.7. Thus, the only reading which is close to the fine lane reading is the 21.15 and the proper reading should be 21.12.

If desired, as indicated above, a revolution counter may be geared to the pointer 79, as, for example, to gear 99 to count the fine lanes in order to provide a check on the fine lane count effected by pointer 79 and dial 83. The lane counter, by itself, does not provide completely satisfactory results since, in the event of temporary signal loss, the counter looses the lane count and inaccurate indications are provided. The present invention, however, provides accurate lane count as soon as signal transmission is restored since it is not dependent upon continuous, uninterrupted signals for the count.

The arrangement of the circular scales 105 to 109, inclusive, is, of course, a function of the frequencies of the transmitters at the stations 10, 11 and 12, and these scales may be changed for different operating frequencies. Moreover, the number of circular scales employed may vary with the number of coarse lanes in the system. Thus, in the example illustrated above, there are five coarse lanes in the system and 51 fine lanes and, accordingly, five circular scales are required. If the number of coarse lanes is changed, the number of circular scales used also changes.

If the ratio of fine lanes to coarse lanes is too great to permit ambiguity resolution by scale readings on the dial 83, resort may be taken to a mathematical solution. Thus, if $N_1/N_2$ is employed to express the frequency or wave length ratio referred to above, N may be used to represent the integer portion of $N_1$ and $\Delta N$ may be used to represent the decimal portion of $N_1$ so that:

$$N_1 = N + \Delta N$$

$N_2$ is equal to $N_1$ plus the difference in revolutions of the card 83 and pointer 79. This difference may be represented $X + \Delta X$ where $X$ is the interger part and $\Delta X$ the decimal part of the difference. Actually $X$ represents the number of coarse lanes crossed and $\Delta X$ is the decimal portion of the coarse lanes traversed. Therefore:

$$\frac{N^1}{N^2} = \frac{N + \Delta N}{N + \Delta N + X + \Delta X} \qquad (1)$$

$N_1/N_2$ is a constant and is, of course, known or can be determined from the frequencies employed in the system. In the example given above it is 10.2:11.2.

$\Delta N$ is read from pointer 79 in cooperation with scale 80.

$\Delta X$ is the difference between reading $\Delta N$ and the reading of pointer 83a on the scale 80 taken clockwise from pointer 79.

Thus, only N and X are unknowns and, as indicated above, each must be an integer. They can, of course, be determined by repeated substitution of integers in Equation 1 above.

To illustrate the method of determining N and X, reference is again made to Fig. 4 which shows that the fine lane reading is .7 as indicated by pointer 79 and scale 80. It can also be determined immediately that the mobile receiver unit 14 is in the center of a coarse lane since the pointer 83a indicates .2 and $\Delta X$ is therefore .5, which is the difference between the indications provided by pointers 79 and 83a taken in a clockwise direction. Equation 1 thus reduces to $$\frac{10.2}{11.2} = \frac{N + .7}{N + X + .7 + .5} \qquad (2)$$

or $$N - 10.2X = 4.4$$

in which N is less than 51 and X is less than 5. Equation 2 is solved by substituting integers 0, 1, 2, 3 etc. for X until an integer is obtained. A solution occurs for $X = 3$ at which time $N = 35$ and thus the reading is 35.7 which agrees with the reading provided by the method using scales 105 to 109 in the manner previously described. Solution of Equations 1 and 2 can also be accomplished using graphs, tables, charts or a computer.

The indicating instrument 90 functions exactly like the instrument 85 described above, thereby providing fine position indications representative of the position of the mobile receiver unit 14 relative to the closely spaced hyperbolic lines 101 and also providing coarse position indications relative to widely spaced hyperbolic isophase lines having foci at the transmitting stations 11 and 12. The manner of operation of the instrument 90 will be obvious in view of the foregoing description.

The described lane identification system is dependent solely upon shaft positions, i.e. the positions of pointer 79 and dial 83, and does not involve revolution counts. Therefore, temporary loss of signal does not introduce inaccuracies to the readings once the system failure has been corrected. Thus, the apparatus of the present invention is dependent only on the present information received and not on the past history of the system as is the case of systems using a revolution counter.

While particular embodiments of the invention have been shown, it will be understood, of course, that the invention is not limited thereto since many modifications may be made, and it is therefore contemplated by the appended claims to cover any such modifications as fall within the true spirit and scope of the invention.

What is claimed as new and desired to be secured by Letters Patent of the United States is:

I claim:

1. A wave signal receiving system for use in a hyperbolic continuous wave type radio position determining system comprising signal receiving means for developing first and second beat frequency signals by heterodyning first and second pairs of received waves and for reproducing first and second reference signals appearing as modulation components of received signals, and a single indicating meter including a fixed indicating element, a pair of movable indicating elements and also including means jointly responsive to both of said beat frequency signals and to both of said reference signals for controlling the movement of both of said movable elements so that said fixed and movable indicating elements coact to provide coarse and fine position indications representative of the position of said receiving system relative to the sources of said pairs of signals.

2. A wave signal receiving system for use in a hyperbolic continuous wave type radio position determining system comprising signal receiving means for developing first and second beat frequency signals by respectively heterodyning first and second pairs of received waves and for reproducing first and second reference signals appearing as modulation components of received signals, and an indicating meter including a movable element and also including means jointly responsive to said first beat frequency signal and to said first reference signal for controlling the movable element to provide a position indication representative of the position of the receiving system relative to the sources of the first pair of waves, said indicating meter also including a movable member disposed adjacent said movable element and means jointly responsive to said second beat frequency and to said second reference signal for controlling the movement of the movable member so that said member coacts with said element to provide a coarse position indication.

3. A wave signal receiving system for use in a hyperbolic continuous wave type radio position determining system comprising signal receiving means for developing first and second beat frequency signals by heterodyning first and second pairs of received waves and for reproducing first and second reference signals appearing as modulation components of received signals, means jointly responsive to the first reference signal and to the first beat frequency, the last named means including a rotatable element for indicating the position of the receiving system relative to the sources of the first pair of waves, a rotatable member positioned adjacent said rotatable element, and means jointly responsive to the second beat frequency and to the second reference signal for rotating said member so that it coacts with said element to provide a coarse position indication representative of the position of the receiving system relative to the sources of said second pair of waves.

4. A wave signal receiving system for use in a hyperbolic continuous wave type radio position determining system comprising signal receiving means for developing first and second beat frequency signals by heterodyning first and second pairs of received waves and for reproducing at first and second reference signals appearing as modulation components of received signals, an indicating meter including a movable pointer and a fixed scale, means jointly responsive to the first reference signal and to the first beat frequency for moving said movable pointer relative to said fixed scale to provide an indication representative of the position of the receiving system relative to the sources of the first pair of waves, a movable scale positioned adjacent said pointer and concentric therewith, and means jointly responsive to the second beat frequency and to the second reference signal for moving said movable scale relative to said pointer in order to provide a coarse position indication.

5. A wave signal receiving system for use in a hyperbolic continuous wave type radio position determining system comprising signal receiving means developing first, second, third and fourth beat frequencies by respectively heterodyning pairs of received signals and also developing first, second, third and fourth reference signals appearing as modulation components upon received waves and having frequencies respectively related to said first, second, third and fourth beat frequencies, said first beat frequency resulting from heterodyning waves respectively received from first and second points, said second beat frequency resulting from heterodyning different waves respectively received from said first and second points, said third beat frequency resulting from heterodyning waves respectively received from said second and third points, a first indicating meter including a fixed indicating element and a pair of movable indicating elements and also including means jointly responsive to said first and second reference signals and to said first and second beat frequencies for controlling the movements of both of said movable elements so that said fixed element and said movable elements coact to provide on said first meter both fine and coarse position indications representative of the position of said receiving system relative to said first and second points, and a second indicating meter including a fixed indicating member and a pair of movable indicating members and also including means jointly responsive to said third and fourth reference signals and to said third and fourth beat frequencies for controlling the movements of both of said movable members to that said fixed member and said movable members coact to provide on said second meter fine and coarse position indications representative of the location of the receiving system relative to said second and third points.

6. A wave signal receiving system for use in a hyperbolic continuous wave type radio position determining system comprising signal receiving means developing first, second, third and fourth beat frequencies by respectively heterodyning pairs of received signals and also developing first, second, third and fourth reference signals appearing as modulation components upon received waves and having frequencies respectively related to said first, second, third and fourth beat frequencies, said first beat frequency resulting from heterodyning waves respectively received from first and second points, said second beat frequency resulting from heterodyning different waves respectively received from said first and second points, said third beat frequency resulting from heterodyning waves respectively received from said second and third points, a first indicating instrument including means jointly responsive to said first reference signal and to said first beat frequency for controlling a rotatable element to provide a fine position indication representative of the position of said receiving system relative to said first and second points, said first indicating instrument including a rotatable member concentric with said element and means jointly responsive to said second reference signal and to said second beat frequency for rotating said member so that said member and said element cooperate to provide a coarse position indication representative of the position of the receiving system relative to said first and second points, and a second indicating instrument including means jointly responsive to said third reference signal and to said third beat frequency for controlling a rotatable element to provide a fine position indication representative of the location of the receiving system relative to said second and third points, said second instrument including a rotatable member concentric with the last-named element and means jointly responsive to said fourth reference signal and to said fourth beat frequency for rotating the last-named member so that the latter coacts with said last-named element to provide a coarse position indication representative of the location of the receiving system relative to said second and third points.

7. A wave signal receiving system for use in a hyperbolic continuous wave type radio position determining system comprising signal receiving means developing first, second, third and fourth beat frequencies by respectively heterodyning pairs of received signals and also developing first, second, third and fourth reference signals appearing as modulation components upon received waves and having frequencies respectively related to said first, second, third and fourth beat frequencies, said first beat frequency resulting from heterodyning waves respectively received from first and second points, said second beat frequency resulting from heterodyning different waves respectively received from said first and second points, said third beat frequency resulting from heterodyning waves respectively received from said second and third points, a first indicating instrument including means jointly responsive to said first reference signal and to said first beat frequency for controlling a rotatable pointer coacting with a fixed scale to provide a fine position indication representative of the position of said receiving system relative to said first and second points, said first indicating instrument including a rotatable scale concentric with said element and means jointly responsive to said second reference signal and to said second beat frequency for rotating said rotatable scale so that said rotatable scale and said pointer cooperate to provide a coarse position indication representative of the position of the receiving system relative to said first and second points, and a second indicating instrument including means jointly responsive to said third reference signal and to said third beat frequency for controlling a rotatable pointer coacting with a fixed scale to provide a fine position indication representative of the location of the receiving system relative to said second and third points, said second instrument including a rotatable scale concentric with the last-named pointer and means jointly responsive to said fourth reference signal and to said fourth beat frequency for rotating the last-named rotatable scale so that the latter coacts with said last-named pointer to provide a coarse position indication representative of the location of the receiving system relative to said second and third points.

8. In a hyperbolic continuous wave type radio position determining system; a transmitting system including means for radiating first and second pairs of signals from spaced apart points, the signals of each pair having different frequencies and being radiated from different points, means for heterodyning said first and second pairs of signals to develop beat frequencies, and means for radiating first and second reference signals derived from said beat frequencies as modulation components upon space radiated waves; and a signal receiving system including signal receiving means for developing first and second beat frequencies by heterodyning said first and second pairs of signals and for reproducing said first and second reference signals, and a single indicating meter including a fixed indicating element and a pair of movable indicating elements and also including means jointly responsive to both of said beat frequencies and to both of said reference signals for controlling the movements of both of said movable elements so that said movable elements and said fixed element coact to provide on said single meter coarse and fine position indications representative of the position of said receiving system relative to the sources of said pairs of signals.

9. In a hyperbolic continuous wave type radio position determining system; a transmitting system including means for radiating a first pair of waves from a first station, and for radiating a second pair of waves from a second station, all of said waves having different frequencies, means for heterodyning one wave of the first pair and one wave of the second pair to develop a first beat frequency and for heterodyning the other wave of the first pair and the other wave of the second pair to develop a second beat frequency, and means for transmitting first and second reference signals respectively derived from said first and second beat frequencies; and a signal receiving system including means for receiving all of said waves, for developing said first and second beat frequency signals and for reproducing said first and second reference signals, and a single indicating meter including a fixed indicating element and a pair of movable indicating elements and also including means jointly responsive to both of said beat frequency signals and to both of said reference signals for controlling the movements of both of said movable elements so that said fixed element and said movable elements coact to provide on said single meter coarse and fine position indications representative of the position of said receiving system relative to said first and second stations.

10. In a hyperbolic continuous wave type radio position determining system; a transmitting system including means for radiating first and second pairs of signals from spaced apart points, the signals of each pair having different frequencies and being radiated from different points, means for heterodyning said first and second pairs of signals to develop beat frequencies, and means for radiating first and second reference signals derived from said beat frequencies as modulation components upon space radiated waves; and a signal receiving system including means for developing said first and second beat frequency signals by heterodyning said first and second pairs of signals and for reproducing said first and second reference signals, and an indicating meter including a movable element and a fixed element and also including means jointly responsive to said first beat frequency signal and to said first reference signal for controlling the movement of said movable element so that it cooperates with the fixed element to provide a position indication representative of the position of the receiving system relative to the sources of the first pair of waves, said indicating meter including a movable member and means jointly responsive to said second beat frequency and to said second reference signal for controlling the movement of said movable member so that it coacts with said movable element to provide a coarse position indication.

11. In a hyperbolic continuous wave type radio position determining system; a transmitting system including, means for radiating a first pair of waves from a first station and for radiating a second pair of waves from a second station, all of said waves having different frequencies, means for heterodyning one wave of the first pair and one wave of the second pair to develop a first beat frequency and for heterodyning the other wave of the first pair and the other wave of the second pair to develop a second beat frequency, and means for transmitting first and second reference signals respectively derived from said first and second reference signals respectively derived from said first and second beat frequencies; and a signal receiving system including means for developing said first and second beat frequency signals by heterodyning said waves and for reproducing said first and second reference signals, and an indicating meter including a rotatable element and a fixed scale and also including means jointly responsive to said first beat frequency signal and to said first reference signal for controlling the movement of said rotatable element so that it coacts with said fixed scale to provide a position indication representative of the position of the receiving system relative to said first and second stations, said indicating meter including a rotatable member and means jointly responsive to said second beat frequency and to said second reference signal for controlling the movement of said rotatable member so that it coacts with said element to provide a coarse position indication representative of the position of the receiving system relative to said first and second stations.

12. In a hyperbolic continuous wave type radio position determining system; a transmitting system including means for radiating first and second pairs of signals from spaced apart points, the signals of each pair having differerent frequencies and being radiated from different points, and means for heterodyning said first and second pairs of signals to develop beat frequencies, and means for radiating first and second reference signals derived from said beat frequencies as modulation components upon space radiated waves; and a signal receiving system including means for developing first and second beat frequencies by heterodyning said first and second pairs of signals and for reproducing said first and second reference signals, mean jointly responsive to the first reference signal and to the first beat frequency and including a rotatable pointer coacting with a fixed scale to indicate the position of the receiving system relative to the sources of the first pair of waves, a rotatable scale positioned adjacent to and concentric with said rotatable pointer, and means jointly responsive to the second beat frequency and to the second reference signal for rotating said rotatable scale so that the latter coacts with said pointer to provide a coarse position indication.

13. In a hyperbolic continuous wave type radio position determining system; a transmitting system including means for radiating a first pair of waves from a first station and for radiating a second pair of waves from a second station, all of said waves having different frequencies, means for heterodyning one wave of the first pair and one wave of the second pair to develop a first beat frequency and for heterodyning the other wave of the first pair and the other wave of the second pair to develop a second beat frequency, and means for transmitting first and second reference signals respectively derived from said first and second beat frequencies; a signal receiving system including means for developing said first and second beat frequencies by heterodyning said waves and for reproducing said first and second reference signals, means jointly responsive to the first reference signal and to the first beat frequency and including a rotatable pointer coacting with a fixed scale to indicate the position of the receiving system relative to the first and second stations, a rotatable scale positioned adjacent to and concentric with said rotatable pointer, and means jointly responsive to the second beat frequency and to the second reference signal for rotating said rotatable scale so that the latter coacts with said pointer to provide a coarse position indication representative of the position of the receiving system relative to said first and second stations.

14. In a hyperbolic continuous wave type radio position determining system; a transmitting system including means for radiating a pair of position indicating signals from each of three spaced apart points, means for heterodyning said signals in pairs to develop first, second, third and fourth beat frequencies, and means for transmitting first, second, third and fourth reference signals derived from said first, second, third and fourth beat frequencies; and a signal receiving system including means for developing said first, second, third and fourth beat frequencies by respectively heterodyning pairs of said signals and for also reproducing said first, second, third and fourth reference signals, a first indicating meter including a fixed indicating element, a pair of movable indicating elements and means jointly responsive to said first and second reference signals and to said first and second beat frequencies for controlling the movements of both of said movable elements so that said fixed element and said movable elements coact to provide on said first meter both fine and coarse position indications representative of the position of said receiving system relative to a first and second of said points, and a second indicating meter including a fixed indicating member, a pair of movable indicating members and means jointly responsive to said third and fourth reference signals and to said third and fourth beat frequencies for controlling the movements of both of said movable members to that said fixed member and said movable members coact to provide on said second meter both fine and coarse position indications representative of the location of the receiving system relative to the second point and to a third point.

15. In a hyperbolic continous wave type radio position determining system; a transmitting system including means for radiating a pair of position indicating signals from each of three spaced apart points, all of said signals having different frequencies with one signal of each pair falling within a first frequency channel and the other signal of each pair falling within a second frequency channel, the mean frequencies of said first and second frequency channels being related by a non integer, means for heterodyning the signals of the first channel in pairs to develop first and second beat frequencies and for heterodyning the signals of the second channel to develop third and fourth beat frequencies, and means for transmitting first, second, third and fourth reference signals derived from said first, second, third and fourth beat frequencies; and a signal receiving system including means for developing said first, second, third and fourth beat frequencies and for also reproducing said first, second, third and fourth reference signals, a first indicating meter including a fixed indicating element, a pair of movable indicating elements and means jointly responsive to said first and second reference signals and to said first and second beat frequencies for controlling the movements of both of said movable elements so that said fixed element and said movable elements coact to provide on said first meter both fine and coarse position indications representative of the position of said receiving system relative to a first and second of said points, and a second indicating meter including a fixed indicating member, a pair of movable indicating members and means jointly responsive to said third and fourth reference signals and to said third and fourth beat frequencies for controlling the movements of both of said movable members so that said fixed member and said movable members coact to provide on said second meter both fine and coarse position indications representative of the location of the receiving system relative to the second point and to a third point.

16. In a hyperbolic continuous wave type radio position determining system; a transmitting system including means for radiating a pair of position indicating signals from each of three spaced apart points, means for heterodyning said signals in pairs to develop first, second, third and fourth beat frequencies, and means for transmitting first, second, third and fourth reference signals derived from said first, second, third and fourth beat frequencies; and a signal receiving system including means for developing said first, second, third and fourth beat frequencies by respectively heterodyning pairs of said signals and for also reproducing said first, second, third and fourth reference signals, a first indicating meter including a fixed indicating element, a first rotatable indicating element and means jointly responsive to said first reference signal and to said first beat frequency for controlling the movement of the first rotatable element so that it coacts with said fixed element to provide a fine position indication representative of the position of said receiving system relative to a first and second of said points, said first indicating meter including a second rotatable element and means jointly responsive to the second beat frequency and to the second reference signal for controlling the movement of said second element so that it coacts with said first element to provide a coarse position indication representative of the position of the receiving system relative to the first and second points, and a second indicating meter including a fixed indicating member, a first rotatable member and also including means jointly responsive to said third reference signal and to said third beat frequency for controlling said first rotatable member so that it coacts with the fixed member to provide a fine position indication representative of the location of the receiving system relative to the second and third of said points, said second meter including a second rotatable member and means responsive to said fourth beat frequency and to said fourth reference signal to control the movement of said second member so that it coacts with the first member to provide on said second meter a coarse position indication representative of the position of the receiving system relative to the second and third points.

17. In a hyperbolic continuous wave type radio position determining system; a transmitting system including means for radiating a pair of position indicating signals from each of three spaced apart points, means for heterodyning said signals in pairs to develop first, second, third and fourth beat frequencies, and means for transmitting first, second, third and fourth reference signals derived from said first, second, third and fourth beat frequencies; and a signal receiving system including means for developing said first, second, third and fourth beat frequencies by respectively heterodyning pairs of said signals and for also reproducing said first, second, third and fourth reference signals, a first indicating instrument including means jointly responsive to said first reference signal and to said first beat frequency for controlling a rotatable pointer coacting with a fixed scale to provide a fine position indication representative of the position of said receiving system relative to a first and second of said points, said first indicating instrument including a rotatable scale concentric with said pointer and means jointly responsive to said second reference signal and to said second beat frequency for rotating said rotatable scale so that the latter coacts with said pointer to provide a coarse position indication representative of the position of the receiving system relative to said first and second points, and a second indicating instrument including means jointly responsive to said third reference signal and to said third beat frequency for controlling a rotatable pointer coacting with a fixed scale to provide a fine position indication representative of the location of the receiving system relative to the second and third of said points, said second instrument including a rotatable scale concentric with the last-named pointer and means jointly responsive to said fourth reference signal and to said fourth beat frequency for rotating the last-named rotatable scale so that the latter coacts with said last-named pointer to provide a coarse position indication representative of the location of the receiving system relative to said second and third points.

18. In a hyperbolic continuous wave type radio position determining system; a transmitting system including means for radiating a pair of position indicating signals from each of three spaced apart points, all of said signals having different frequencies with one signal of each pair falling within a first frequency channel and the other signal of each pair falling within a second frequency channel, the mean frequencies of said first and second frequency channels being related by a non integer, means for heterodyning the signals of the first channel in pairs to develop first and second beat frequencies and for heterodyning the signals of the second channel to develop third and fourth beat frequencies, and means for transmitting first, second, third and fourth reference signals derived from said first, second, third and fourth beat frequencies; and a signal receiving system including means for developing said first, second, third and fourth beat frequencies and for also reproducing said first, second, third and fourth reference signals, a first indicating meter including a fixed indicating element, a first rotatable indicating element and means jointly responsive to said first reference signal and to said first beat frequency for controlling the movement of said first rotatable element so that it coacts with the fixed element to provide a fine position indication representative of the position of said receiving system relative to a first and second of said points, said first indicating meter including a second rotatable element and means jointly responsive to the second beat frequency and to the second reference signal for controlling the movement of said second rotatable member so that it coacts with said first element to provide a coarse position indication representative of the position of the receiving system relative to the first and second points, and a second indicating meter including a fixed indicating meter, a first rotatable indicating member and means jointly responsive to said third reference signal and to said third beat frequency for controlling the movement of said first rotatable member so that it coacts with the fixed member to provide a fine position indication representative of the location of the receiving system relative to the second and third of said points, said second meter including a second rotatable member and means responsive to said fourth beat frequency and to said fourth reference signal to control the movement of said second rotatable member so that it coacts with the first rotatable member to provide a coarse position indication representative of the position of the receiving system relative to the second and third points.

19. In a hyperbolic continuous wave type radio position determining system; a transmitting system including means for radiating a pair of position indicating signals from each of three spaced apart points, all of said signals having different frequencies with one signal of each pair falling within a first frequency channel and the other signal of each pair falling within a second frequency channel, the mean frequencies of said first and second frequency channels being related by a non integer, means for heterodyning the signals of the first channel in pairs to develop first and second beat frequencies and for heterodyning the signals of the second channel to develop third and fourth beat frequencies, and means for transmitting first, second, third and fourth reference signals derived from said first, second, third and fourth beat frequencies; and a signal receiving system including means for developing said first, second, third and fourth beat frequencies and for also reproducing said first, second, third and fourth reference signals, a first indicating instrument including means jointly responsive to said first reference signal and to said first beat frequency for controlling a rotatable pointer coacting with a fixed scale to provide a fine position indication representative of the position of said receiving system relative to a first and second of said points, said first indicating instrument including a rotatable scale concentric with said pointer and means jointly responsive to said second reference signal and to said second beat frequency for rotating said rotatable scale so that the latter cooperates with said pointer to provide a coarse position indication representative of the position of the receiving system relative to said first and second points, and a second indicating instrument including means jointly responsive to said third reference signal and to said third beat frequency for controlling a rotatable pointer coacting with a fixed scale to provide a fine position indication representative of the location of the receiving system relative to the second and third of said points, said second instrument including a rotatable scale concentric with the last-named pointer and means jointly responsive to said fourth reference signal and to said fourth beat frequency for rotating the last-named rotatable scale so that the latter coacts with said last-named pointer to provide a coarse position indication representative of the location of the receiving system relative to said second and third points.

References Cited in the file of this patent

UNITED STATES PATENTS

| 2,531,908 | Grenfell | Nov. 28, 1950 |
| 2,611,127 | Palmer | Sept. 16, 1952 |
| 2,652,559 | Hawkins | Sept. 15, 1953 |